US010898981B2

(12) United States Patent
Andujo et al.

(10) Patent No.: US 10,898,981 B2
(45) Date of Patent: Jan. 26, 2021

(54) WORKPIECE STORAGE DEVICE AND WORKPIECE LOADING METHOD

(71) Applicant: AMADA HOLDINGS CO., LTD., Kanagawa (JP)

(72) Inventors: Abraham Andujo, Buena Park, CA (US); Hiroki Tsuruta, Kanagawa (JP)

(73) Assignee: AMADA HOLDINGS CO., LTD., Kanagawa (JP)

( * ) Notice: Subject to any disclaimer, the term of this patent is extended or adjusted under 35 U.S.C. 154(b) by 89 days.

(21) Appl. No.: 16/225,911

(22) Filed: Dec. 19, 2018

(65) Prior Publication Data

US 2020/0198077 A1 Jun. 25, 2020

(51) Int. Cl.
*A47F 7/00* (2006.01)
*B23Q 7/10* (2006.01)
(Continued)

(52) U.S. Cl.
CPC ............ *B23Q 7/103* (2013.01); *A47F 7/0042* (2013.01); *B23Q 7/046* (2013.01); *B65D 25/107* (2013.01);
(Continued)

(58) Field of Classification Search
CPC ........ B23Q 7/103; B23Q 7/046; B23Q 7/001; B23Q 7/106; B23Q 7/1426;
(Continued)

(56) References Cited

U.S. PATENT DOCUMENTS 2,989,189 A * 6/1961 Leone .................... B42F 17/02
211/41.1
3,362,609 A * 1/1968 Freedy ................... B65D 5/504
206/587
(Continued)

FOREIGN PATENT DOCUMENTS

JP 5-193744 A 8/1993
JP 1-162428 U 11/1998
(Continued)

OTHER PUBLICATIONS

Japan Official Action received in JP2019-570147, dated Feb. 5, 2020.
(Continued)

*Primary Examiner* — Jennifer E. Novosad
(74) *Attorney, Agent, or Firm* — Greenblum & Bernstein, P.L.C.

(57) ABSTRACT

A first plate-like member on a bottom surface side is disposed in a horizontal direction. A second plate-like member is disposed in a vertical direction. A first position restricting mechanism is engaged with a first end portion including a first side that opposes the first plate-like member in a workpiece in a state where the workpiece stands while a front surface and a rear surface of the plate-like workpiece are along a vertical direction, and restricts the position of the first end portion in a plate thickness direction. A second position restricting mechanism is engaged with a second end portion including a second side that opposes the second plate-like member in the workpiece, and restricts the posi- (Continued)

tion of the second end portion in the plate thickness direction.

6 Claims, 12 Drawing Sheets

(51) Int. Cl.
| | | |
|---|---|---|
| *B23Q 7/04* | (2006.01) | |
| *B65D 25/10* | (2006.01) | |
| *B65D 85/48* | (2006.01) | |
| *B23Q 7/00* | (2006.01) | |
| *B23Q 7/14* | (2006.01) | |

(52) U.S. Cl.
CPC .............. *B65D 85/48* (2013.01); *B23Q 7/001* (2013.01); *B23Q 7/106* (2013.01); *B23Q 7/1426* (2013.01)

(58) Field of Classification Search
CPC .......... H01L 21/6734; H01L 21/67326; B65D 85/48; B65D 85/30; B65D 25/107; A47F 7/0042; A47F 7/0057; A47F 5/005; A47F 7/144; A47B 57/58; A47B 57/588
USPC ..... 211/41.14, 41.12, 40, 41.18, 41.17, 41.1, 211/41.3, 184; 206/54, 448, 449, 564, 206/587, 455, 456
See application file for complete search history.

(56) References Cited

U.S. PATENT DOCUMENTS

| | | | | |
|---|---|---|---|---|
| 3,559,866 A * | 2/1971 | Olson, Sr. | ............. | B65D 85/48 206/587 |
| 3,850,296 A * | 11/1974 | Hirata | ................. | B65D 81/051 206/711 |
| 4,126,229 A * | 11/1978 | Sheres | ............... | G11B 33/0433 211/40 |
| 4,427,114 A * | 1/1984 | Howell | ................ | H05K 9/0067 206/454 |
| 4,485,922 A * | 12/1984 | Desmond | ............. | B65D 5/5021 206/485 |
| 4,619,368 A * | 10/1986 | Kappelt, Jr. | ........ | H05K 13/0069 206/449 |
| 4,762,689 A * | 8/1988 | Frey | ........................ | B01D 53/86 206/454 |
| 5,474,190 A * | 12/1995 | Won-Kim | ............ | A47B 57/588 211/184 |
| 5,857,573 A * | 1/1999 | Pakeriasamy | ........ | B65D 25/107 206/454 |
| 6,010,009 A * | 1/2000 | Peterson | ............ | G11B 33/0444 206/454 |
| 6,102,206 A * | 8/2000 | Pride | ....................... | B65D 85/48 206/454 |
| 6,279,757 B1 * | 8/2001 | Hayoun | ............. | G11B 33/0405 211/40 |
| 6,588,605 B1 * | 7/2003 | Volkert | ................ | B65D 88/005 206/449 |
| 7,001,130 B2 * | 2/2006 | Ransom | ................. | B25J 9/0096 206/448 |
| 7,160,514 B2 * | 1/2007 | Chouinard | ........... | B65D 25/107 206/307.1 |
| 7,182,559 B1 * | 2/2007 | Groth | ...................... | B60P 3/002 410/32 |
| 7,510,091 B2 * | 3/2009 | Sollers | ............... | B65D 19/0002 211/41.14 |
| 7,604,121 B1 * | 10/2009 | Tang | ..................... | B65D 25/06 206/454 |
| 7,971,733 B2 * | 7/2011 | Ponto | .................... | B65D 19/44 108/55.1 |
| 8,720,691 B2 * | 5/2014 | Hu | ........................ | B65D 5/5088 206/454 |
| 8,757,355 B2 * | 6/2014 | Weigl | ................... | B65G 49/062 198/379 |
| 8,777,008 B2 * | 7/2014 | Hu | ........................ | B65D 81/055 206/454 |
| 8,910,791 B2 * | 12/2014 | Zhao | ..................... | B65D 81/022 206/454 |
| 8,997,988 B2 * | 4/2015 | Shi | ........................ | B65D 81/113 206/454 |
| 2001/0027934 A1 * | 10/2001 | Yoneda | ................ | B65D 25/107 206/725 |
| 2003/0141213 A1 * | 7/2003 | Bartholomew | ........ | B65D 85/48 206/454 |
| 2004/0022607 A1 * | 2/2004 | Lim | .................. | H01L 21/67326 414/222.01 |
| 2004/0238465 A1 * | 12/2004 | Mercure | ............... | A47F 7/0042 211/41.14 |
| 2005/0087470 A1 * | 4/2005 | Chuang | ............. | B65D 43/0218 206/503 |
| 2005/0126952 A1 * | 6/2005 | Kaltz, Jr. | ............. | B65D 25/103 206/592 |
| 2006/0043032 A1 * | 3/2006 | McHugh | .............. | B65G 49/062 211/41.14 |
| 2006/0196838 A1 * | 9/2006 | Mercure | ............. | B65G 49/062 211/41.1 |
| 2007/0045204 A1 * | 3/2007 | Huard | .................... | B65D 85/48 211/41.14 |
| 2011/0056868 A1 * | 3/2011 | Ting | ................. | B65D 85/48 206/587 |
| 2012/0000866 A1 * | 1/2012 | Huszczo | ................ | B65D 19/44 211/41.14 |
| 2012/0031787 A1 * | 2/2012 | McColl | ................ | B65D 19/20 206/320 |
| 2013/0233759 A1 * | 9/2013 | Chan | ..................... | B65D 81/113 206/589 |
| 2014/0001085 A1 * | 1/2014 | Zhao | ..................... | B65D 85/30 206/722 |
| 2014/0076770 A1 * | 3/2014 | Kuo | ..................... | B65D 81/133 206/587 |
| 2014/0097115 A1 * | 4/2014 | Kuo | .................. | H01L 21/67369 206/454 |
| 2014/0166536 A1 * | 6/2014 | Hu | ........................ | B65D 5/509 206/722 |
| 2015/0041435 A1 * | 2/2015 | Gu | ........................ | C03C 21/002 216/97 |
| 2019/0218022 A1 * | 7/2019 | Mader | .................... | A47F 7/0042 |
| 2019/0322408 A1 * | 10/2019 | Burda | .................. | B65D 25/107 |
| 2020/0198077 A1 * | 6/2020 | Andujo | ................. | B23Q 7/046 |

FOREIGN PATENT DOCUMENTS

| | | |
|---|---|---|
| JP | 2001-1085 A | 1/2001 |
| JP | 2016-128179 A | 7/2016 |
| JP | 2017-56467 A | 3/2017 |
| JP | 2017-64737 A | 4/2017 |
| WO | 00/61315 A1 | 10/2000 |

OTHER PUBLICATIONS

Notice of Reasons for Refusal received in 2019-570147, dated Feb. 4, 2020.

Decision to Grant a Patent received in 2019-570147, dated Mar. 31, 2020.

* cited by examiner

WORKPIECE STORAGE DEVICE AND WORKPIECE LOADING METHOD

BACKGROUND

The present disclosure relates to a workpiece storage device and a workpiece loading method.

PCT International Publication No. 2000/61315 (PTL 1) describes an automatic bending system in which a press brake and a bending robot cooperate with each other to automatically bend a workpiece. The bending robot holds a workpiece and transports the workpiece to the press brake. The press brake sandwiches the workpiece between a punch and a die, and the bending robot for holding the workpiece moves to bend the workpiece.

As described in PTL 1 or Japanese Unexamined Patent Application Publication No. 2016-128179 (PTL 2), a plurality of workpieces are stored in a standing state in a workpiece storage device. The bending robot holds one of the workpieces stored in the workpiece storage device and transports the workpiece to the press brake.

SUMMARY

When the workpiece storage device described in PTL 1 or 2 stores a large workpiece, there is a case where the workpiece bends and comes into contact with an adjacent workpiece. When a plurality of workpieces are stored in a state of being in contact with one another, there is a case where the bending robot is not capable of holding and transporting the workpieces one by one. In addition, when the workpieces are in contact with one another, there is a case where abrasion scratches occur, and the quality of the workpiece deteriorates.

Accordingly, it is desirable for the workpiece storage device to store the plurality of workpieces in a state of not being in contact with one another. In the workpiece loading method, it is desirable to load the workpieces one by one on the press brake from a workpiece storage device that stores the plurality of workpieces in a state of not being in contact with one another.

A first aspect of one or more embodiments provides a workpiece storage device including: a first plate-like member on a bottom surface side disposed in a horizontal direction; a second plate-like member disposed in a vertical direction; a first position restricting mechanism which is provided integrally with the first plate-like member or separately from the first plate-like member on the first plate-like member, and is engaged with a first end portion including a first side that opposes the first plate-like member in the workpiece in a standing state of the workpiece while a front surface and a rear surface of the plate-like workpiece are along the vertical direction, thereby restricting the position of the first end portion in a plate thickness direction; and a second position restricting mechanism which is provided integrally with the second plate-like member or separately from the second plate-like member on the second plate-like member, and is engaged with a second end portion including a second side that opposes the second plate-like member in the workpiece, thereby restricting the position of the second end portion in the plate thickness direction.

A second aspect of one or more embodiments provides a workpiece loading method including: in a standing state of workpieces while a front surface and a rear surface of the plate-like workpiece are along a vertical direction, storing a plurality of workpieces in a workpiece storage device in a state where both a first end portion including a first side and a second end portion including a second side adjacent to the first side in each workpiece are engaged with two surfaces of the workpiece storage device; disposing the workpiece storage device on a loading device disposed in a third end portion of a rail mechanism by transporting the workpiece storage device that stores the plurality of workpieces; fixing a position of the workpiece storage device with respect to the loading device by a locking mechanism by positioning the workpiece storage device on the loading device by a positioning mechanism; moving the loading device on which the workpiece storage device is fixed to a fourth end portion of the rail mechanism; and taking out one workpiece from the workpiece storage device by holding the workpiece among the plurality of workpieces stored in the workpiece storage device positioned at the fourth end portion with a gripper provided in a bending robot and transporting the workpiece to a press brake.

DETAILED DESCRIPTION

Hereinafter, a workpiece storage device and a workpiece loading method according to one or more embodiments will be described with reference to the accompanying drawings.

Figure 1:
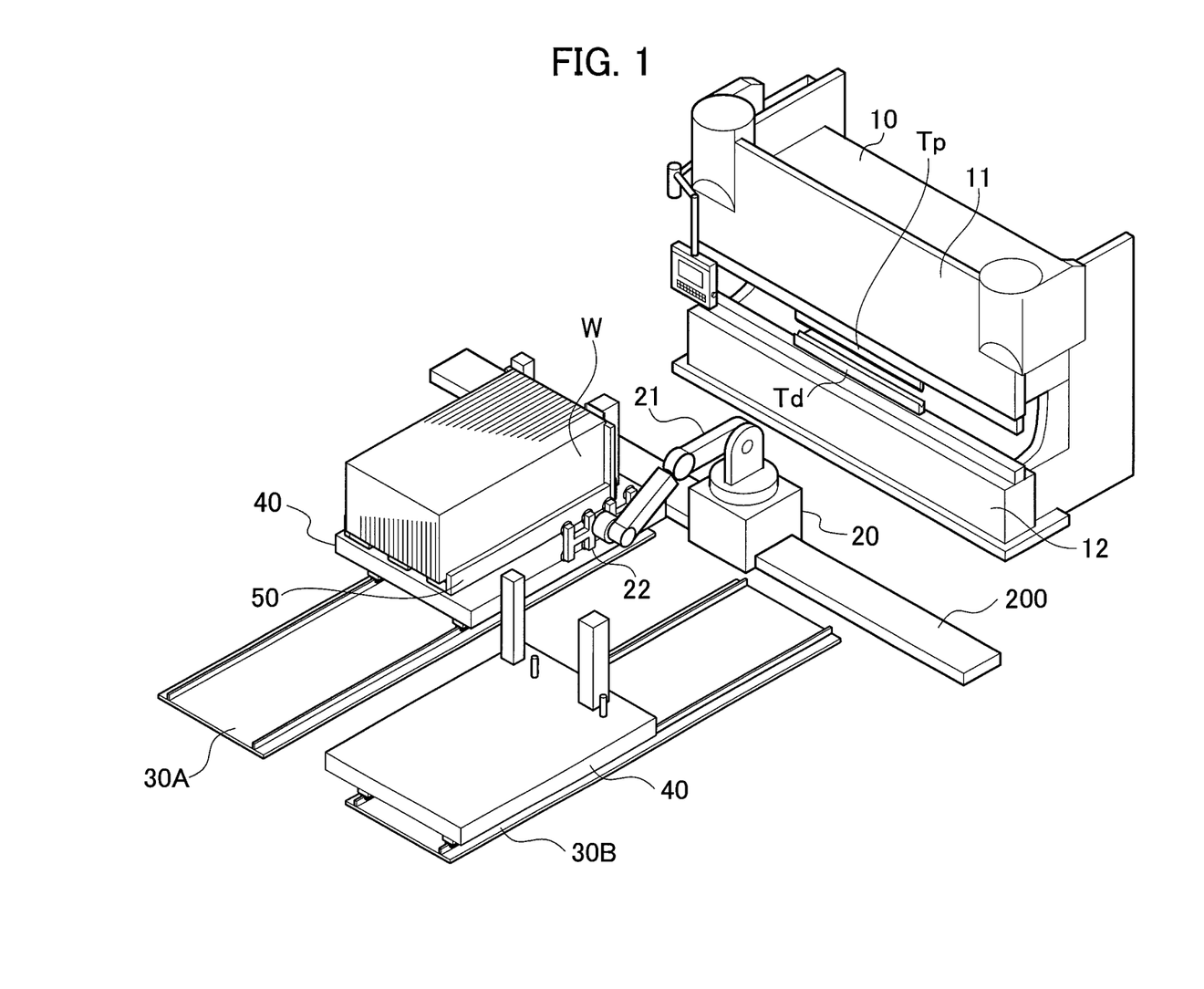
FIG. 1 is a perspective view illustrating a schematic configuration example of an automatic bending system including a press brake and a bending robot.

First, with reference to FIG. 1, a schematic configuration example of an automatic bending system including a press brake and a bending robot will be described. As illustrated in FIG. 1, the automatic bending system includes a press brake 10 and a bending robot 20. The press brake 10 includes an upper table 11 movable in an up-down direction and a fixed lower table 12. A punch Tp, which is an upper tool, is mounted on the upper table 11 and a die Td, which is a lower tool, is mounted on the lower table 12.

As will be described below, the bending robot 20 holds a plate-like workpiece W and transports the workpiece W between the punch Tp and the die Td. The workpiece W is a sheet metal, such as stainless steel plate, mild steel plate, aluminum plate or the like. The press brake 10 lowers the upper table 11 to sandwich the workpiece W between the punch Tp and the die Td, and the bending robot 20 moves a multi-joint arm 21 to bend the workpiece W.

The bending robot 20 is disposed on a guide rail 200 and is formed to be movable in a left-right direction of the press brake 10 along the guide rail 200. A vacuum gripper 22 for suctioning and holding the workpiece W is mounted on the tip end of the arm 21. A mechanical gripper that grips and holds the workpiece W may be mounted on the tip end of the arm 21, or the vacuum gripper 22 and the mechanical gripper may be formed to be exchangeable.

In front of the bending robot 20, two rail mechanisms 30A and 30B are installed. In the rail mechanisms 30A and 30B, a loading device 40 is disposed. The loading device 40 is formed to move along the rail mechanisms 30A or 30B with the power using a motor.

In the example illustrated in FIG. 1, a workpiece storage device 50 that stores the plurality of workpieces W is disposed and fixed to the loading device 40 on the rail mechanism 30A. Hereinafter, there is a case where the workpiece storage device 50 is abbreviated as a storage device 50. The loading device 40 in which the storage device 50 is fixed is initially positioned in the end portion on a side opposite to the bending robot 20 of the rail mechanism 30A, and moves to the end portion on the bending robot 20 side. The motor that moves the loading device 40 has a decelerating mechanism.

The motor decelerates the loading device 40 in order as approaching the end portion on the bending robot 20 side, and activates the brake when being positioned in the end portion. Accordingly, the position of the loading device 40 is fixed on the end portion of the rail mechanism 30A on the bending robot 20 side.

In the example illustrated in FIG. 1, the storage device 50 is not disposed in the loading device 40 on the rail mechanism 30B. The storage device 50 that stores the plurality of workpieces W may be disposed and fixed to the loading device 40 on the rail mechanism 30B.

Figure 2:
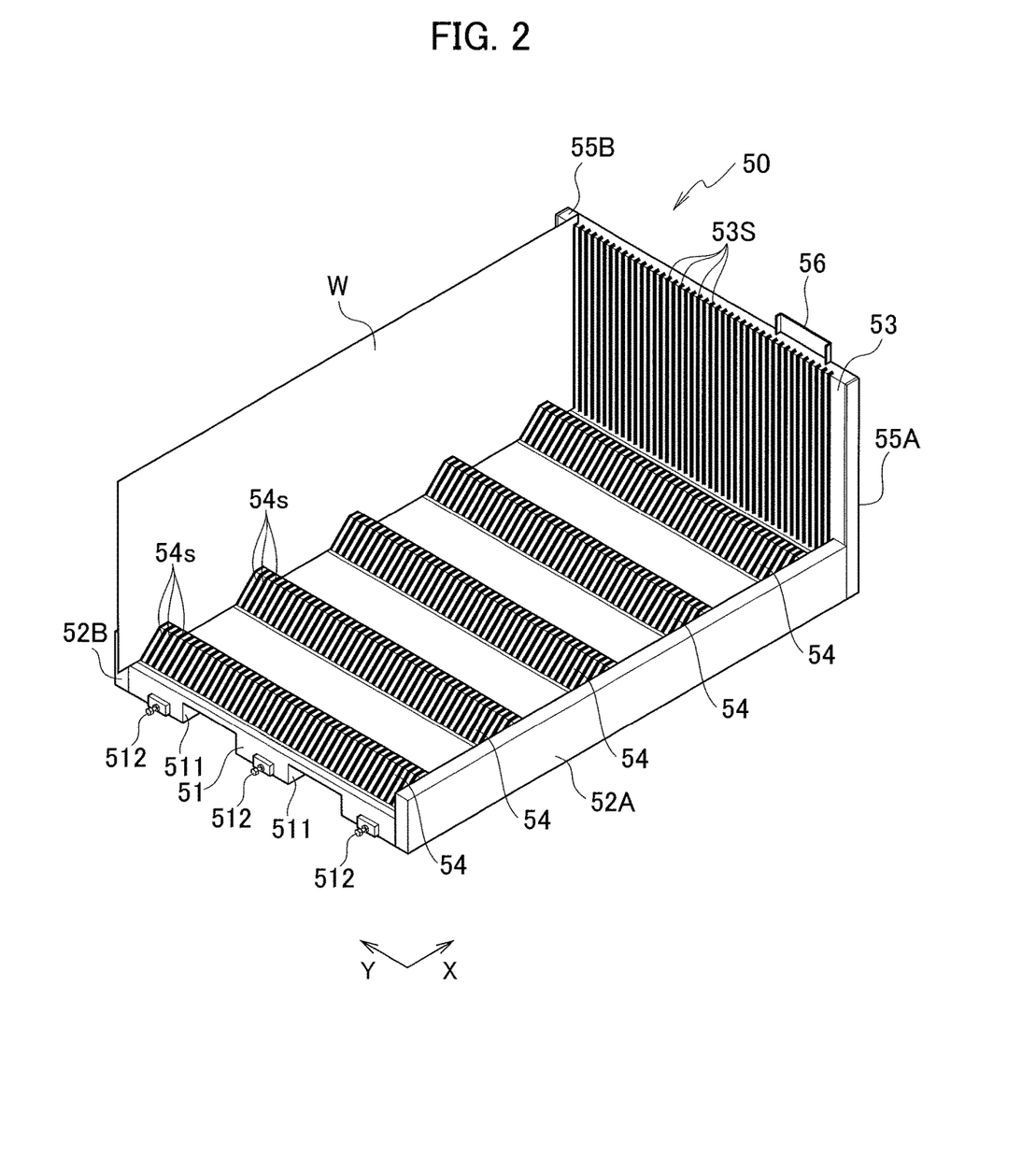
FIG. 2 is a perspective view illustrating a workpiece storage device according to one or more embodiments.

Here, a specific configuration of the storage device 50 will be described. As illustrated in FIG. 2, the storage device 50 includes a bottom plate 51, side plates 52A and 52B fixed to both sides of the bottom plate 51, and a front plate 53 fixed to one end portion of the side plates 52A and 52B. The bottom plate 51 is a first plate-like member on the bottom surface side disposed in the horizontal direction. The front plate 53 is a second plate-like member disposed in the vertical direction.

The storage device 50 is disposed on the loading device 40, while the front plate 53 side is oriented toward the bending robot 20. The front plate 53 side is the front side of the storage device 50, and the side opposite to the front plate 53 side is the rear side of the storage device 50. A width direction of the storage device 50 is defined as an X direction, and a front-rear direction is defined as a Y direction.

On the bottom plate 51, two recess portions 511 for inserting forks of a forklift which will be described later are formed. On a rear end surface of the bottom plate 51, three protruding abutting portions 512 are provided. The abutting portion 512 includes bolts, for example.

A mountain-shaped comb teeth member 54 is mounted on the bottom plate 51. As an example, on the bottom plate 51, five comb teeth members 54 are disposed at equal intervals in the Y direction with an interval between adjacent comb teeth members 54. A plurality of slits 54s (first slits) are formed in the comb teeth member 54. The plurality of slits 54s are arranged in a direction orthogonal to a first side that opposes the bottom plate 51 in the workpiece W. At each position in the X direction, the slits 54s of the five comb teeth members 54 are positioned on a straight line in the Y direction.

The comb teeth member 54 can be formed by bending a metal plate into a mountain shape and by forming the plurality of slits 54s. Although the comb teeth member 54 is provided separately from the bottom plate 51, a configuration equivalent to the comb teeth member 54 may be provided integrally with the bottom plate 51.

On the front plate 53, a plurality of slits 53s (second slits) that extend from the position of the upper surface of the bottom plate 51 to the upper end portion of the front plate 53 are formed. The plurality of slits 53s are arranged in a direction orthogonal to the second side that opposes the front plate 53 in the workpiece W. At each position in the X direction, the slit 53s is formed at a position that corresponds to the slit 54s. That is, at each position in the X direction, the slits 54s of the five comb teeth members 54 and the slits 53s of the front plate 53 are positioned on a straight line in the Y direction. On both sides of the front plate 53, side plates 55A and 55B are fixed.

A plate 56 is attached to the upper end portion on the front side of the front plate 53 such that a sensor provided in the loading device 40 detects that the storage device 50 is disposed on the loading device 40.

Instead of forming the slits 53s on the front plate 53, a comb teeth member including the same configuration as the slit 53s may be attached onto the front plate 53.

In the storage device 50 configured as described above, the workpiece W can be mounted on the slits 53s and 54s at each position in the X direction, and the plurality of workpieces W can be stored in a standing state. The standing state of the workpiece W means that the front surface and the rear surface of the workpiece W are in a state along the vertical direction.

Figure 3:
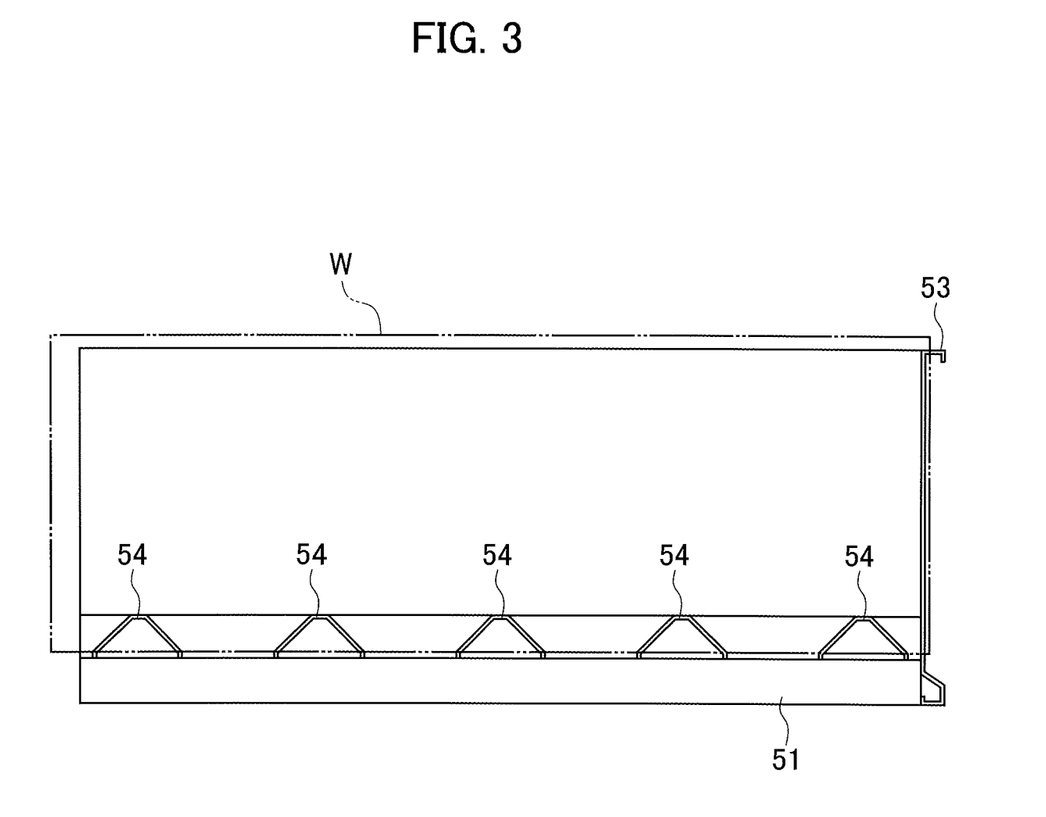
FIG. 3 is a conceptual view illustrating a state where the workpiece storage device stores a workpiece.

FIG. 2 illustrates a state where one workpiece W is mounted on the storage device 50. FIG. 3 illustrates a state where the side plates 52A, 52B, 55A, and 55B are omitted and the storage device 50 stores the workpiece W. As illustrates in FIG. 3, each workpiece W is stored in the storage device 50 in a standing state by inserting the lower end portion and the front end portion into the slits 53s and 54s.

In FIG. 2, each slit 54s of the comb tooth member 54 functions as a first position restricting mechanism that is engaged with a first end portion (lower end portion), including the first side of the workpiece W, and restricts the position of the first end portion in the plate thickness direction. Each slit 53s formed on the front plate 53 functions as a second position restricting mechanism that is engaged with a second end portion (front end portion), including the second side of the workpiece W, and restricts the position of the second end portion in the plate thickness direction.

The engagement of the first and second end portions with the slits 54s and 53s respectively means that the first and second end portions are respectively inserted into the slits 54s and 53s, and the positions of the first and second end portions are restricted. Note that, the widths of the slits 54s and 53s are set to be wider than the plate thickness of the workpiece W to have a predetermined margin in order that the workpiece W can be easily inserted into the storage device 50, and the workpiece W can be easily taken out from the storage device 50.

Figure 4:
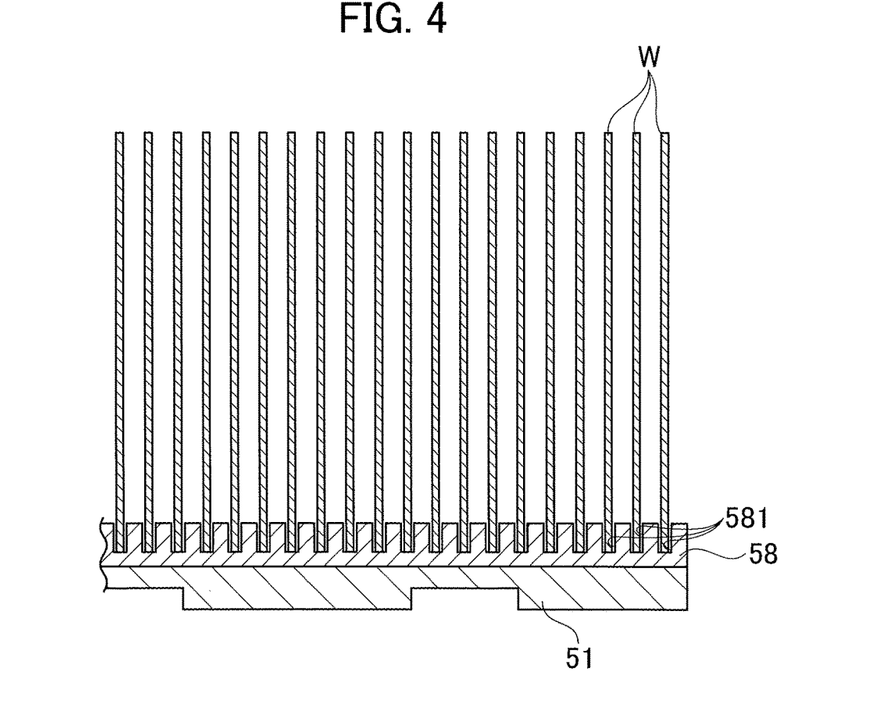
FIG. 4 is a partial sectional view illustrating a first modified example of a position restricting mechanism of the workpiece.

The first and second position restricting mechanisms are not limited to slits. As a first modified example as illustrated in FIG. 4, the first position restricting mechanism may be a positioning member 58 where a plurality of recess portions 581 that store the first end portion of the workpiece W are formed. The positioning member 58 may be formed integrally with the bottom plate 51. Similarly, the second position restricting mechanism may be a positioning member where the plurality of recess portions are formed.

Figure 5:
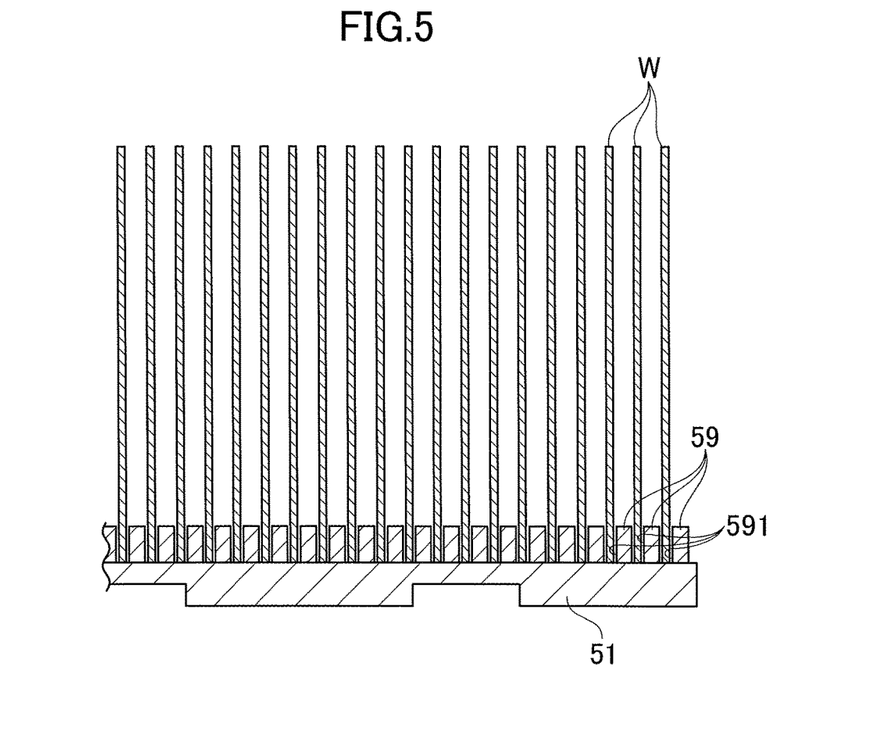
FIG. 5 is a partial sectional view illustrating a second modified example of the position restricting mechanism of the workpiece.

As a second modified example, as illustrated in FIG. 5, the first position restricting mechanism is a plurality of protrusion portions 59 formed on the bottom plate 51, and may be formed such that the first end portion is stored in a gap 591 formed by the adjacent protrusion portions 59. The protrusion portion 59 may be a metal bar or a metal plate. Similarly, the second position restricting mechanism is also a plurality of protrusion portions, and may be formed such that the second end portion is stored in a gap formed by the adjacent protrusion portions.

The first and second position restricting mechanisms may be any combination of slits, recess portions, and gaps formed by protrusion portions. The first and second position restricting mechanisms may be formed to engage both the first end portion including the first side of the workpiece W and the second end portion including the second side adjacent to the first side with each other on two surfaces of the storage device 50, and to restrict the position of the workpiece W in the plate thickness direction.

Figure 6:
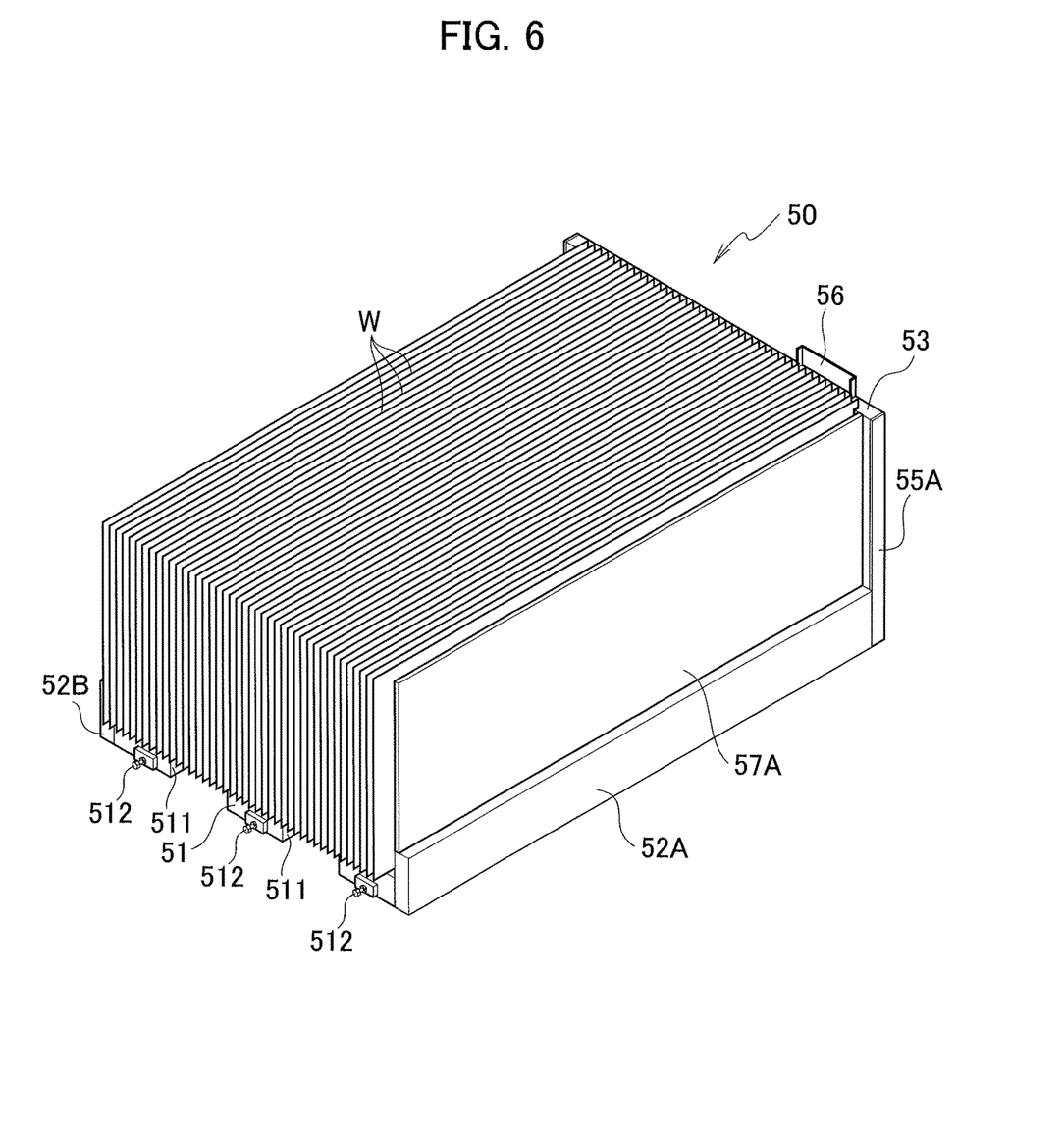
FIG. 6 is a perspective view illustrating a state where the workpiece storage device stores a plurality of workpieces and side panels are mounted.

FIG. 6 illustrates the storage device 50 in a state where the workpiece W is mounted on all of the slits 53s and 54s. When the external setup for mounting the workpiece W to the storage device 50 is completed, the storage device 50 is disposed to be transported onto the loading device 40 using a forklift. At this time, in order to improve the rigidity of the storage device 50, side panels 57A and 57B are mounted on the side plates 52A and 52B, respectively.

Figure 7:
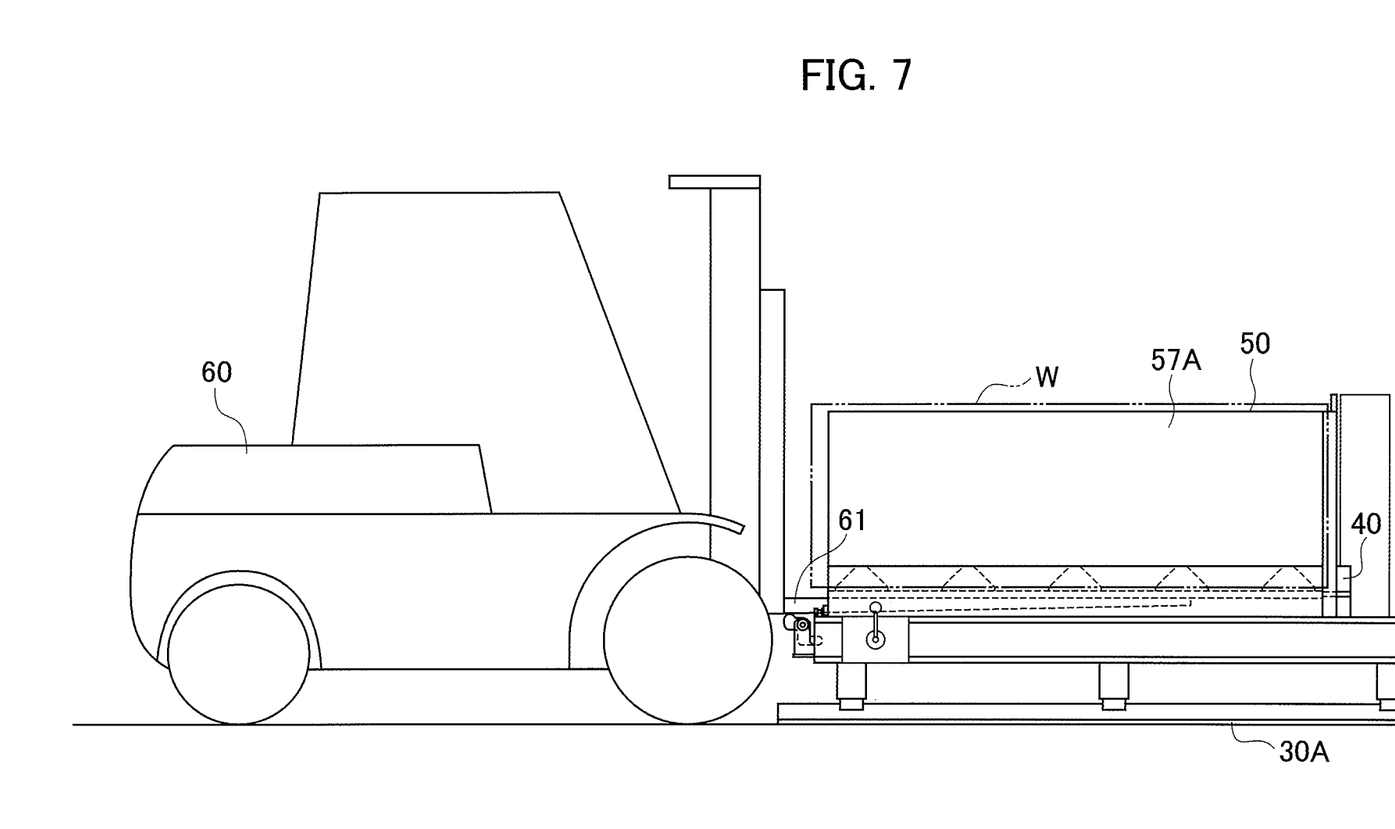
FIG. 7 is a side view illustrating a state where a forklift transports the workpiece storage device onto a loading device.

As illustrated in FIG. 7, the loading device 40 is positioned in the end portion (third end portion) of the rail mechanism 30A on the side opposite to the bending robot 20. The forklift 60 inserts the forks 61 into the recess portions 511, and transports the storage device 50 onto the loading device 40. When the storage device 50 is disposed on the loading device 40, the side panels 57A and 57B are detached.

Figure 8:
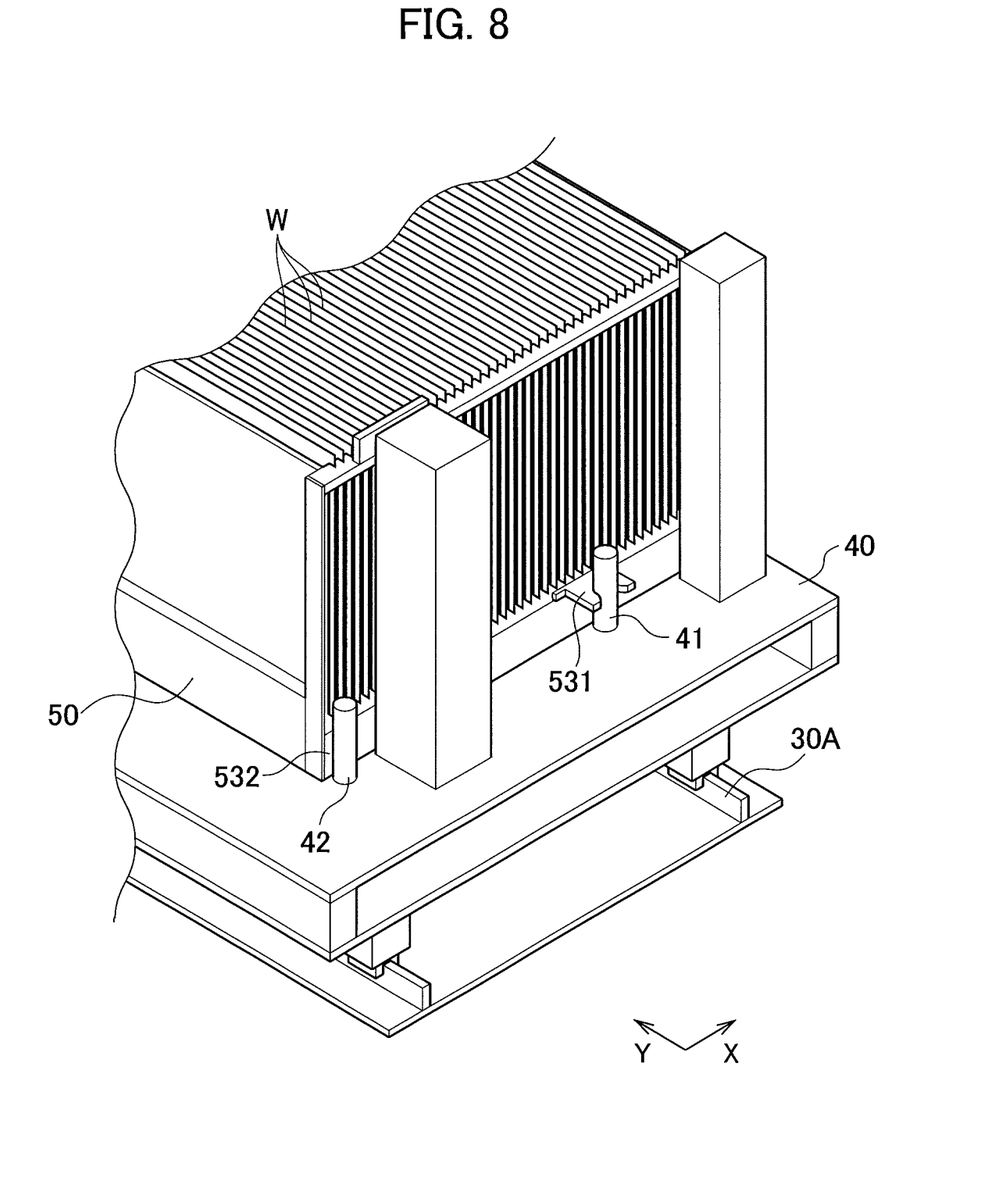
FIG. 8 is a partial perspective view illustrating a configuration example of a positioning mechanism for positioning a front end portion of the workpiece storage device on the loading device.

As illustrated in FIG. 8, in the vicinity of the front end portion of the loading device 40, positioning rods 41 and 42 made of cylindrical metal bars are provided. A positioning plate 531 is fixed to the vicinity of the lower end portion of the front plate 53 of the storage device 50. In the positioning plate 531, a V-shaped or U-shaped cutout into which the positioning rod 41 can penetrate is formed. A positioning flange 532 is formed in the lower end portion on the side of the front plate 53.

When the positioning rod 41 is engaged with the cutout of the positioning plate 531 and the positioning rod 42 comes into contact with the positioning flange 532, the storage device 50 is positioned in the X direction and in the Y direction on the loading device 40. The positioning rods 41 and 42, the positioning plate 531, and the positioning flange 532 are examples of a positioning mechanism for positioning the storage device 50 at a predetermined position on the loading device 40.

Figure 9:
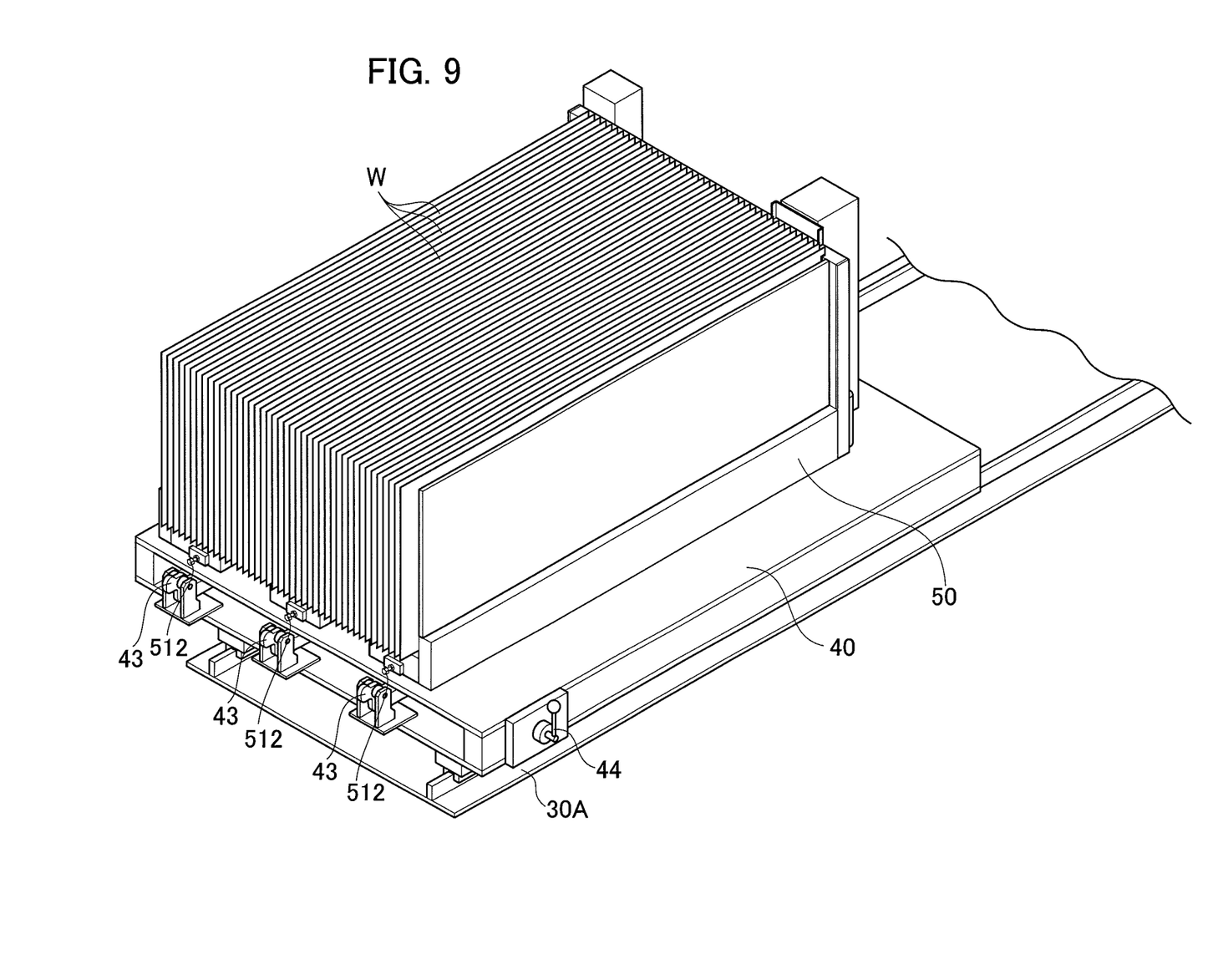
FIG. 9 is a perspective view illustrating a configuration example of a locking mechanism provided in a rear end portion of the loading device in order to fix the position of the workpiece storage device on the loading device.
Figure 10:
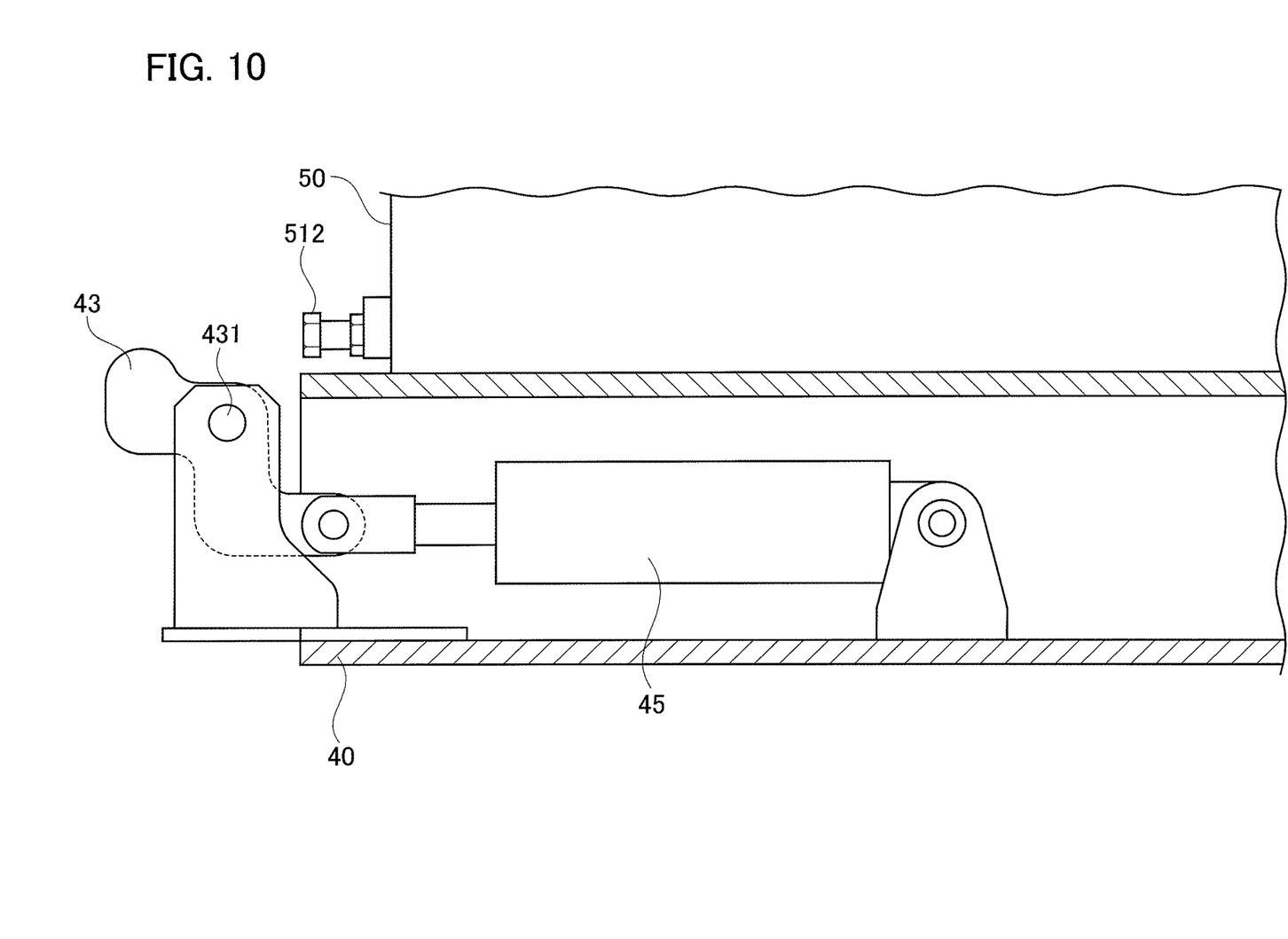
FIG. 10 is a partially enlarged side view illustrating a state before the locking mechanism fixes the position of the workpiece storage device.

As illustrated in FIG. 9, in the rear end portion of the loading device 40, three links 43 are provided corresponding to the positions of the three abutting portions 512 provided in the storage device 50. As illustrated in the partially enlarged side view of FIG. 10, the link 43 rotates around a fulcrum 431. The loading device 40 includes a cylinder 45.

Figure 11:
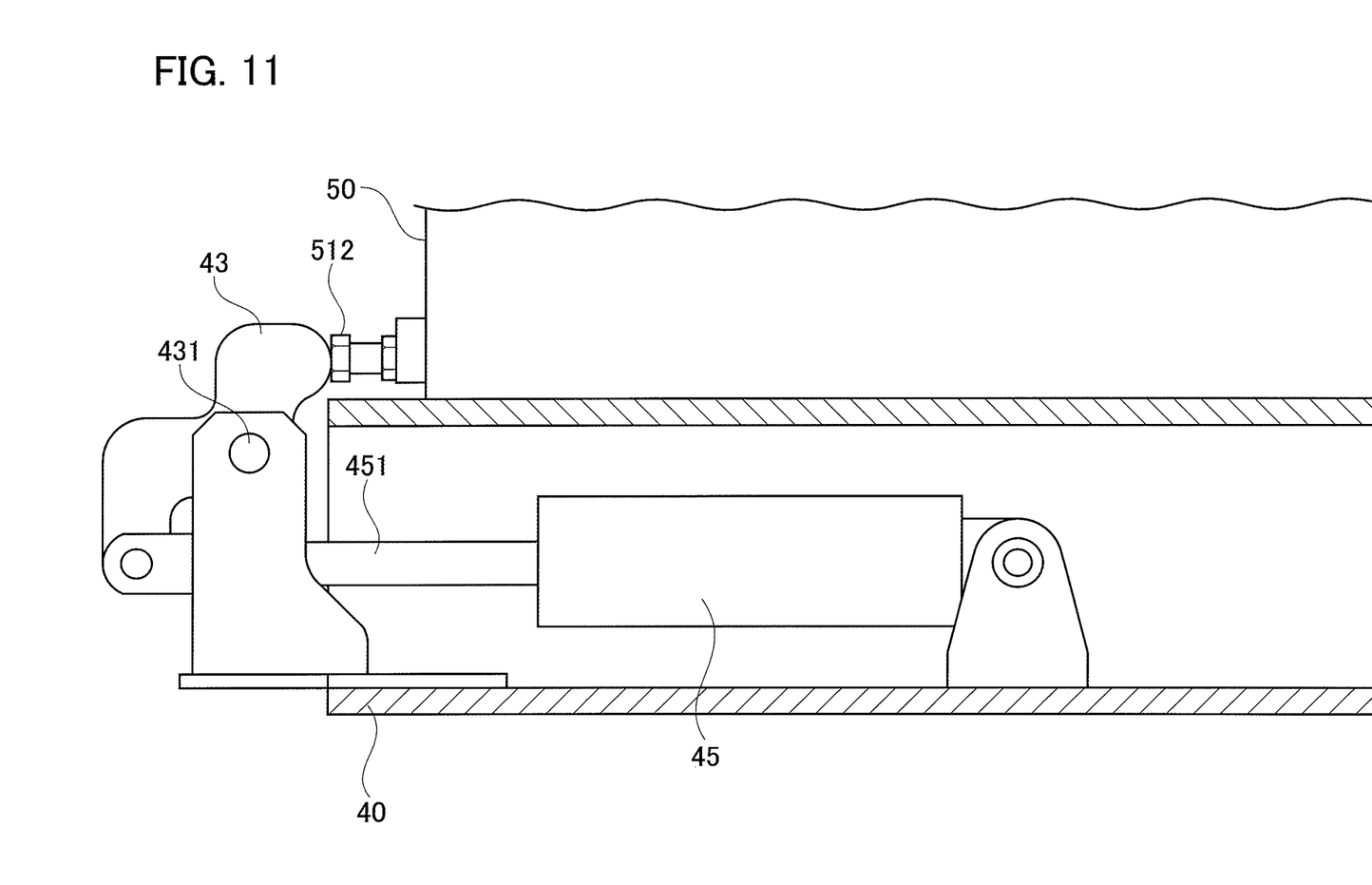
FIG. 11 is a partially enlarged side view illustrating a state where the locking mechanism fixes the position of the workpiece storage device.

When a hand valve 44 illustrated in FIG. 9 is operated, as illustrated in FIG. 11, the cylinder 45 pushes out a piston rod 451. Then, the piston rod 451 rotates the link 43 around the fulcrum 431, and the link 43 is pressed against the abutting portion 512. The link 43 and the cylinder 45 function as a locking mechanism for fixing the position of the storage device 50 on the loading device 40.

As described above, the front end side of the storage device 50 is positioned on the loading device 40 by the engagement between the positioning rods 41 and 42, the positioning plate 531, and the positioning flange 532. The three links 43 provided in the rear end portion of the loading device 40 are pressed against the three abutting portions 512, and the positioning plate 531 and the positioning flange 532 are pressed against the positioning rods 41 and 42.

Figure 12:
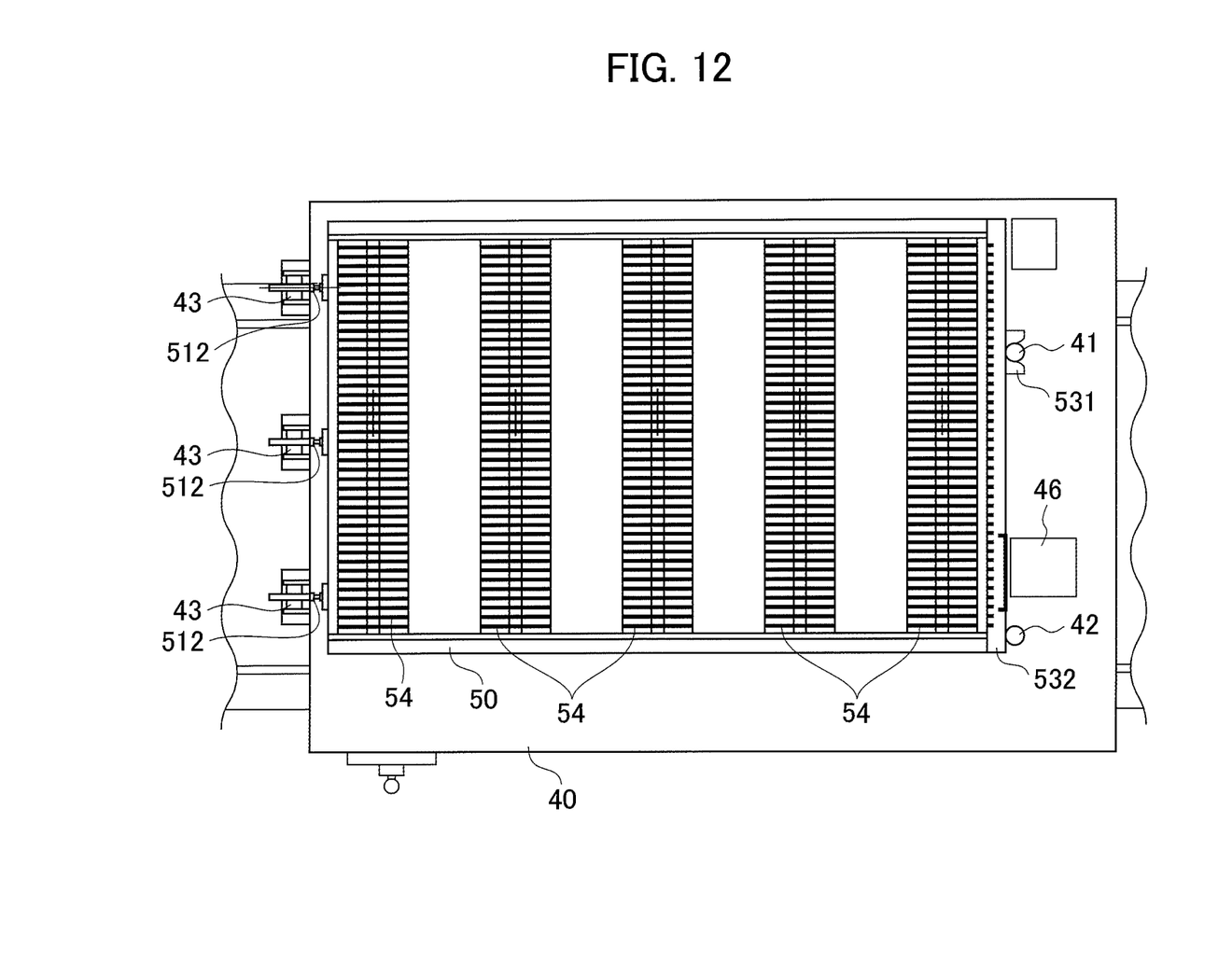
FIG. 12 is a plan view of a state where the workpiece storage device is positioned on the loading device by the positioning mechanism and the position is fixed by the locking mechanism when viewed from above.

Accordingly, as illustrated in FIG. 12, the storage device 50 is accurately positioned at a predetermined position on the loading device 40. Note that, in FIG. 12, the workpiece W stored in the storage device 50 is omitted. As illustrated in FIG. 12, the plate 56 of the storage device 50 opposes the sensor 46 provided in the loading device 40. The sensor 46 detects that the storage device 50 is disposed on the loading device 40. The sensor 46 is a sensor that detects that the sensor 46 is in proximity, for example, due to a change in electrostatic capacitance value. The type of the sensor 46 is not limited.

Next, a workpiece loading method according to one or more embodiments will be described. As illustrated in FIG. 6, two adjacent sides of the plurality of workpiece W are stored in the storage device 50 in a state of being engaged with two surfaces of the storage device 50 and standing, by the external set-up. As illustrated in FIG. 7, the storage device 50 that stores the workpiece W is transported using the forklift 60 or the like and disposed on the loading device 40 disposed in the third end portion of the rail mechanism 30A (or 30B).

As illustrated in FIG. 8, the positioning mechanism positions the storage device 50 in a predetermined position on the loading device 40, and as illustrated in FIG. 11, the locking mechanism fixes the position of the storage device 50 with respect to the loading device 40.

Figure 13:
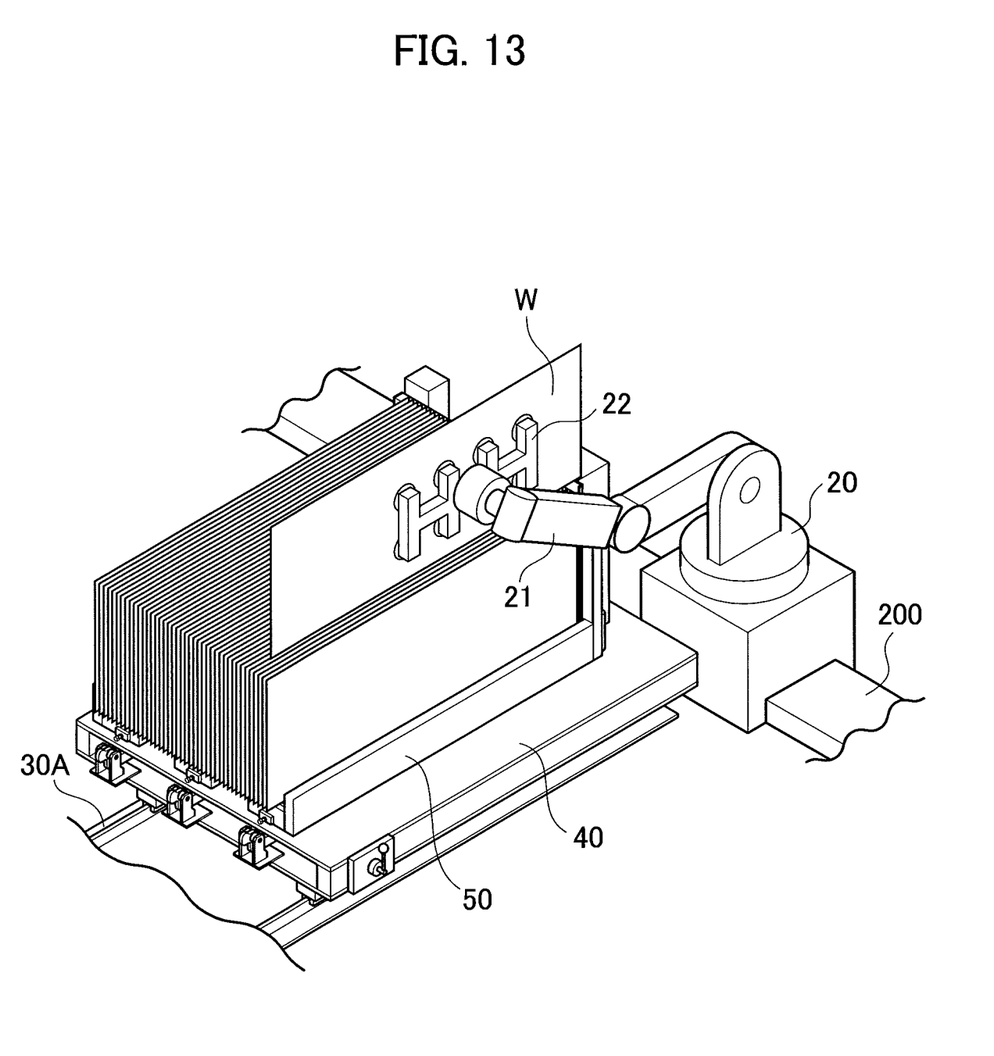
FIG. 13 is a perspective view illustrating a state where the bending robot takes out one workpiece from the workpiece storage device and transports the workpiece to the press brake.

As illustrated in FIG. 1, the loading device 40 travels by itself and moves toward the end portion (fourth end portion) on the bending robot 20 side to be stopped. As illustrated in FIG. 13, the vacuum gripper 22 is pressed against the front surface or the rear surface of the workpiece W at the end portion of the plurality of workpieces W stored in the storage device 50, and one workpiece W is suctioned. Accordingly, one workpiece W is adsorbed and held using the vacuum gripper 22, and is transported to the press brake 10.

As described above, in accordance with the workpiece storage device 50 according to one or more embodiments, it is possible to store the plurality of workpieces W in a state of not being in contact with one another. Accordingly, the bending robot 20 can hold and transport the workpieces W one by one, abrasion scratches may not occur in the workpiece W, and the quality of the workpiece does not deteriorate. In accordance with the workpiece loading method according to one or more embodiments, the bending robot 20 can load the workpieces one by one onto the press brake from the workpiece storage device 50 that stores the plurality of workpieces W in a state of not being in contact with one another.

As a comparative example, there is a workpiece storage device which stacks the plurality of workpieces W horizontally. When holding and transporting the horizontally stacked workpieces W using the bending robot 20, the large-sized workpiece W hangs down by gravity, whereby the workpiece W is likely to be dropped. Therefore, the bending robot 20 needs to transport the workpiece W at a low speed, and the operation speed cannot be increased. On the other hand, in accordance with the workpiece storage device 50 according to one or more embodiments, since the workpiece W is stored in a standing state, it is possible to prevent the hanging of the workpiece W during the transport using the bending robot 20. Accordingly, the operating speed of the bending robot 20 can be increased, whereby the takt time of processing can be shortened.

The present invention is not limited to the above-described one or more embodiments, and various modifications can be made without departing from the scope of the present invention. The bending robot 20 is not limited to suctioning and transporting the workpiece W using the vacuum gripper 22, and may be gripped using a mechanical gripper so as to be transported.

What is claimed is:

1. A workpiece storage device for storing one or more plate-like workpieces made of sheet metal, comprising:
   a first plate-like member on a bottom surface side disposed in a horizontal direction, the first plate-like member being made of metal;
   a second plate-like member disposed in a vertical direction that is perpendicular to the horizontal direction;
   a first position restricting mechanism which is provided integrally with the first plate-like member or separately from the first plate-like member on the first plate-like member, the first position restricting mechanism being made of metal, wherein the first position restricting mechanism is configured to engage a first end portion of the workpiece that comprises a first side edge of the workpiece in a state in which the workpiece is oriented in the vertical direction and both a front surface and a rear surface of the workpiece are along oriented in a plane that extends in the vertical direction such that the first side edge of the workpiece opposes the first plate-like member, thereby restricting a position of the first end portion in a plate thickness direction of the workpiece; and
   a second position restricting mechanism which is provided integrally with the second plate-like member or separately from the second plate-like member on the second plate-like member, wherein the second position restricting mechanism is configured to engage a second end portion of the workpiece that comprises a second side edge of the workpiece in the state in which the workpiece is oriented in the vertical direction such that the second side edge of the workpiece opposes the second plate-like member, thereby restricting a position of the second end portion in the plate thickness direction of the workpiece, the plate thickness direction of the workpiece being oriented perpendicular to the plane,
   wherein
   the first position restricting mechanism comprises a plurality of comb teeth members each comprising a first slit into which the first end portion is inserted, and
   the plurality of comb teeth members are disposed in a first direction along the first side edge of the workpiece with a space provided between adjacent comb teeth members.

2. The workpiece storage device according to claim 1, wherein the plurality of comb teeth members comprise a plurality of first slits arranged in a second direction orthogonal to the first direction such that the workpiece storage device stores a plurality of workpieces.

3. A workpiece storage device for storing one or more plate-like workpieces made of sheet metal, comprising:
   a first plate-like member on a bottom surface side disposed in a horizontal direction, the first plate-like member being made of metal;
   a second plate-like member disposed in a vertical direction that is perpendicular to the horizontal direction;
   a first position restricting mechanism which is provided integrally with the first plate-like member or separately from the first plate-like member on the first plate-like member, the first position restricting mechanism being made of metal, wherein the first position restricting mechanism is configured to engage a first end portion of the workpiece that comprises a first side edge of the workpiece in a state in which the workpiece is oriented in the vertical direction and both a front surface and a rear surface of the workpiece are oriented in a plane that extends in the vertical direction such that the first side edge of the workpiece opposes the first plate-like member, thereby restricting a position of the first end portion in a plate thickness direction of the workpiece, the plate thickness direction of the workpiece being oriented perpendicular to the plane; and
   a second position restricting mechanism which is provided integrally with the second plate-like member or separately from the second plate-like member on the second plate-like member, wherein the second position restricting mechanism is configured to engage a second end portion of the workpiece that comprises a second side edge of the workpiece in the state in which the workpiece is oriented in the vertical direction such that the second side edge of the workpiece opposes the second plate-like member, thereby restricting a position of the second end portion in the plate thickness direction of the workpiece,
   wherein
   the second position restricting mechanism includes a second slit into which the second end portion is inserted.

4. The workpiece storage device according to claim 3, wherein the second plate-like member is formed with a plurality of second slits arranged in a direction orthogonal to the second side edge of the workpiece.

5. The workpiece storage device according to claim 1, wherein the workpiece storage device stores one or more workpieces that are held and transported by a bending robot one by one to a press brake, for bending each workpiece by the press brake.

6. The workpiece storage device according to claim 3, wherein the workpiece storage device stores one or more workpieces that are held and transported by a bending robot one by one to a press brake, for bending each workpiece by the press brake.

* * * * *

UNITED STATES PATENT AND TRADEMARK OFFICE
CERTIFICATE OF CORRECTION

PATENT NO. : 10,898,981 B2  
APPLICATION NO. : 16/225911  
DATED : January 26, 2021  
INVENTOR(S) : A. Andujo et al.

Page 1 of 1

It is certified that error appears in the above-identified patent and that said Letters Patent is hereby corrected as shown below:

In the Claims

At Column 7, Line 51, please change "are along" to -- are --.

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*